(12) United States Patent
Solodky et al.

(10) Patent No.: US 10,996,326 B2
(45) Date of Patent: May 4, 2021

(54) GENERATION OF A FAMILY OF ORTHOGONAL SIGNALS FOR A CDMA RADAR SYSTEM

(71) Applicant: GM Global Technology Operations LLC, Detroit, MI (US)

(72) Inventors: Gaston Solodky, Kfar Saba (IL); Oren Longman, Tel Aviv (IL); Shahar Villeval, Tel Aviv (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 211 days.

(21) Appl. No.: 16/189,045

(22) Filed: Nov. 13, 2018

(65) Prior Publication Data

US 2020/0150257 A1    May 14, 2020

(51) Int. Cl.
  *G01S 13/28* (2006.01)
  *G01S 13/931* (2020.01)
  *G01S 7/02* (2006.01)
  *H04B 7/0413* (2017.01)

(52) U.S. Cl.
  CPC ............ *G01S 13/284* (2013.01); *G01S 7/023* (2013.01); *G01S 13/931* (2013.01); *H04B 7/0413* (2013.01)

(58) Field of Classification Search
  CPC ...... G01S 13/89; G01S 13/284; G01S 13/931; G01S 13/726; G01S 7/023; H04B 7/0413; H04B 7/066; H04B 7/216; H04B 7/2628; H04B 7/2615

USPC .......................................................... 342/203
  See application file for complete search history.

(56) References Cited

U.S. PATENT DOCUMENTS

| | | | | |
|---|---|---|---|---|
| 5,657,021 | A * | 8/1997 | Ehsani-Nategh | G01S 13/426 342/70 |
| 7,430,253 | B2 * | 9/2008 | Olson | H04B 1/71052 375/316 |
| 2005/0009476 | A1 * | 1/2005 | Wu | H04B 7/0697 455/101 |
| 2010/0207804 | A1 * | 8/2010 | Hayward | G01S 7/414 342/28 |
| 2011/0013716 | A1 * | 1/2011 | Brodzik | H04J 13/10 375/295 |
| 2016/0154091 | A1 * | 6/2016 | Yosoku | G01S 7/023 342/201 |

(Continued)

*Primary Examiner* — Erin F Heard
*Assistant Examiner* — Michael W Justice
(74) *Attorney, Agent, or Firm* — Cantor Colburn LLP

(57) ABSTRACT

A system and method to generate a family of orthogonal signals for a code division multiple access (CDMA) radar system involve selecting a first signal of the family of orthogonal signals for transmission by one of a plurality of transmitters of the radar system. The method includes using an algorithm to determine a second signal of the family of orthogonal signals. The algorithm uses cross-correlation values between candidate signals for consideration as the second signal of the family of orthogonal signals and the first signal. The method also includes transmitting the first signal of the family of orthogonal signals and the second signal of the family of orthogonal signals simultaneously from two different transmitters, and obtaining and processing reflections resulting from transmission of the first signal of the family of orthogonal signals and the second signal of the family of orthogonal signals.

14 Claims, 5 Drawing Sheets

(56) References Cited

U.S. PATENT DOCUMENTS

2016/0285172 A1* 9/2016 Kishigami ............. H01Q 21/08
2017/0307729 A1* 10/2017 Eshraghi ................ G01S 13/931
2018/0095163 A1* 4/2018 Lovberg ................. G01S 7/023
2019/0250249 A1* 8/2019 Raphaeli ................ G01S 13/931

* cited by examiner

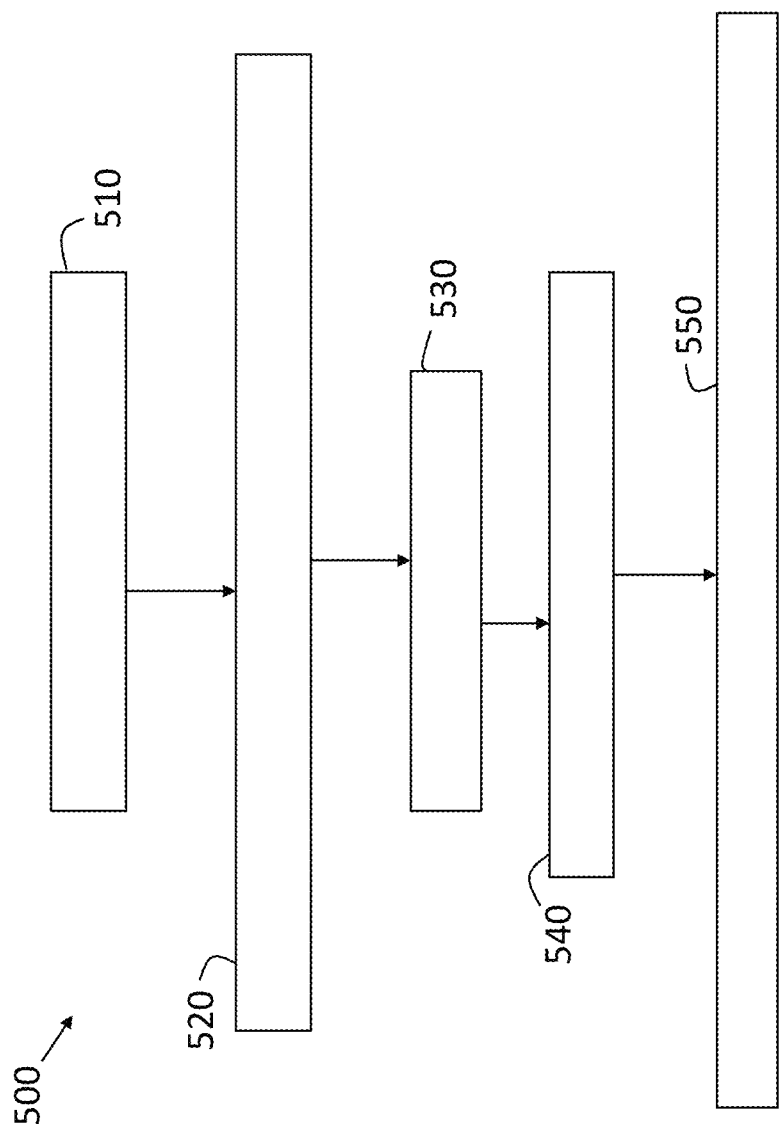

US 10,996,326 B2

GENERATION OF A FAMILY OF ORTHOGONAL SIGNALS FOR A CDMA RADAR SYSTEM

INTRODUCTION

The subject disclosure relates to the generation of a family of orthogonal signals for a code division multiple access (CDMA) radar system.

Radar systems are increasingly used to detect and track objects. For example, a vehicle (e.g., automobile, truck, construction equipment, farm equipment, automated factory equipment) may include one or more radar systems to detect potential obstacles in its path of travel. Detection of objects facilitates enhanced or automated vehicle operation (e.g., adaptive cruise control, collision avoidance, automatic braking). A MIMO radar system includes multiple transmitters and multiple receivers that receive reflections resulting from transmissions by all of the transmitters. A CDMA MIMO radar system includes transmitters that each transmit a different code simultaneously. Orthogonality among transmitted signals reduces interference among their resulting reflections. Accordingly, it is desirable to generate a family of orthogonal signals.

SUMMARY

In one exemplary embodiment, a method of generating a family of orthogonal signals for a code division multiple access (CDMA) radar system includes selecting a first signal of the family of orthogonal signals for transmission by one of a plurality of transmitters of the radar system, and using an algorithm to determine a second signal of the family of orthogonal signals. The algorithm uses cross-correlation values between candidate signals for consideration as the second signal of the family of orthogonal signals and the first signal. The method also includes transmitting the first signal of the family of orthogonal signals and the second signal of the family of orthogonal signals simultaneously from two different transmitters, and obtaining and processing reflections resulting from transmission of the first signal of the family of orthogonal signals and the second signal of the family of orthogonal signals.

In addition to one or more of the features described herein, the method also includes iteratively using the algorithm to determine additional signals of the family of orthogonal signals. The algorithm uses cross-correlation values between each candidate signal for consideration as one of the additional signals of the family of orthogonal signals and all previously determined ones of the family of orthogonal signals.

In addition to one or more of the features described herein, the method also includes generating each of the candidate signals by changing only a parameter value α from the first signal of the family of orthogonal signals and others of the candidate signals.

In addition to one or more of the features described herein, the changing the parameter value α changes a curvature of the candidate signals.

In addition to one or more of the features described herein, the method also includes deriving factors w, k1 and k2 that are used to generate the candidate signals from the parameter value α as follows:

$$w = \frac{\alpha \beta}{\pi}$$

$$k_1 = 2\arctan\left(\frac{B}{2wT}\right)$$

$$k_2 = \sec\left(\frac{k_1 T}{2}\right),$$

where B is a bandwidth of each of the candidate signals and T is a duration of each of the candidate signals.

In addition to one or more of the features described herein, the generating the candidate signals includes determining instantaneous frequency f(t) and phase φ(t) of each of the candidate signals as:

$$f(t) = \frac{w\tan(k_1 t)\sec(k_1 t)}{k_2}$$

$$\varphi(t) = \frac{2\pi w \sec(k_1 t)}{(k_1 k_2)}.$$

In addition to one or more of the features described herein, the using the algorithm includes obtaining a sum associated with each candidate signal as a sum of the cross-correlation values between the candidate signal and all previously determined ones of the family of orthogonal signals, and identifying a selected signal among the candidate signals as the candidate signal that results in a lowest value of the sum associated with each candidate signal.

In addition to one or more of the features described herein, the using the algorithm includes identifying a maximum associated with each candidate signal as a maximum value among the cross-correlation values between the candidate signal and all previously determined ones of the family of orthogonal signals that is less than or equal to a threshold value, and identifying a selected signal among the candidate signals as the candidate signal that results in a minimum of the maximum associated with each candidate signal.

In addition to one or more of the features described herein, the method also includes increasing the threshold value when the selected signal is not identified.

In addition to one or more of the features described herein, the using the algorithm includes identifying a maximum associated with each candidate signal as a maximum value among the cross-correlation values between the candidate signal and all previously determined ones of the family of orthogonal signals that is less than or equal to a threshold value, and identifying a selected signal among the candidate signals as the candidate signal that results in a minimum of the maximum associated with each candidate signal based on at least one of the candidate signals having the maximum that is less than or equal to the threshold value.

In another exemplary embodiment, a system to generate a family of orthogonal signals for a code division multiple access (CDMA) radar system includes a memory device to store a first signal of the family of orthogonal signals for transmission by one of a plurality of transmitters of the radar system, and a processor to use an algorithm to determine a second signal of the family of orthogonal signals. The algorithm uses cross-correlation values between candidate signals for consideration as the second signal of the family of orthogonal signals and the first signal. The system also includes two different transmitters of the radar system to respectively transmit the first signal of the family of orthogonal signals and the second signal of the family of orthogonal signals simultaneously, and at least one receiver to obtain reflections resulting from transmission of the first signal of the family of orthogonal signals and the second signal of the family of orthogonal signals.

In addition to one or more of the features described herein, the processor iteratively uses the algorithm to determine additional signals of the family of orthogonal signals, and the algorithm uses cross-correlation values between each candidate signal for consideration as one of the additional signals of the family of orthogonal signals and all previously determined ones of the family of orthogonal signals.

In addition to one or more of the features described herein, the processor generates each of the candidate signals by changing only a parameter value α from the first signal of the family of orthogonal signals and others of the candidate signals, and changing the parameter value α changes a curvature of the candidate signal.

In addition to one or more of the features described herein, the processor derives factors w, k1 and k2 that are used to generate the candidate signals from the parameter value α as follows:

$$w = \frac{\alpha\beta}{\pi}$$
$$k_1 = 2\arctan\left(\frac{B}{2wT}\right)$$
$$k_2 = \sec\left(\frac{k_1 T}{2}\right),$$

where B is a bandwidth of each of the candidate signals and T is a duration of each of the candidate signals.

In addition to one or more of the features described herein, the processor generates the candidate signals by determining instantaneous frequency f(t) and phase φ(t) of each of the candidate signals as:

$$f(t) = \frac{w\tan(k_1 t)\sec(k_1 t)}{k_2}$$
$$\varphi(t) = \frac{2\pi w\sec(k_1 t)}{(k_1 k_2)}.$$

In addition to one or more of the features described herein, the algorithm includes obtaining a sum associated with each candidate signal as a sum of the cross-correlation values between the candidate signal and all previously determined ones of the family of orthogonal signals, and identifying a selected signal among the candidate signals as the candidate signal that results in a lowest value of the sum associated with each candidate signal.

In addition to one or more of the features described herein, the algorithm includes identifying a maximum associated with each candidate signal as a maximum value among the cross-correlation values between the candidate signal and all previously determined ones of the family of orthogonal signals that is less than or equal to a threshold value, and identifying a selected signal among the candidate signals as the candidate signal that results in a minimum of the maximum associated with each candidate signal.

In addition to one or more of the features described herein, the processor increases the threshold value when the selected signal is not identified.

In addition to one or more of the features described herein, the algorithm includes identifying a maximum associated with each candidate signal as a maximum value among the cross-correlation values between the candidate signal and all previously determined ones of the family of orthogonal signals that is less than or equal to a threshold value, and identifying a selected signal among the candidate signals as the candidate signal that results in a minimum of the maximum associated with each candidate signal based on at least one of the candidate signals having the maximum that is less than or equal to the threshold value.

In addition to one or more of the features described herein, the radar system is in a vehicle, and information processed from the reflections is used to control operation of the vehicle.

In addition to one or more of the features described herein, the algorithm includes identifying a maximum associated with each candidate signal as a maximum value among the cross-correlation values between the candidate signal and all previously determined ones of the family of orthogonal signals that is less than or equal to a threshold value, and identifying a selected signal among the candidate signals as the candidate signal that results in a minimum of the maximum associated with each candidate signal based on at least one of the candidate signals having the maximum that is less than or equal to the threshold value.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 5 is a process flow of a method of generating a family of orthogonal signals for a CDMA MIMO radar system according to one or more embodiments.

DETAILED DESCRIPTION

Figure 1:
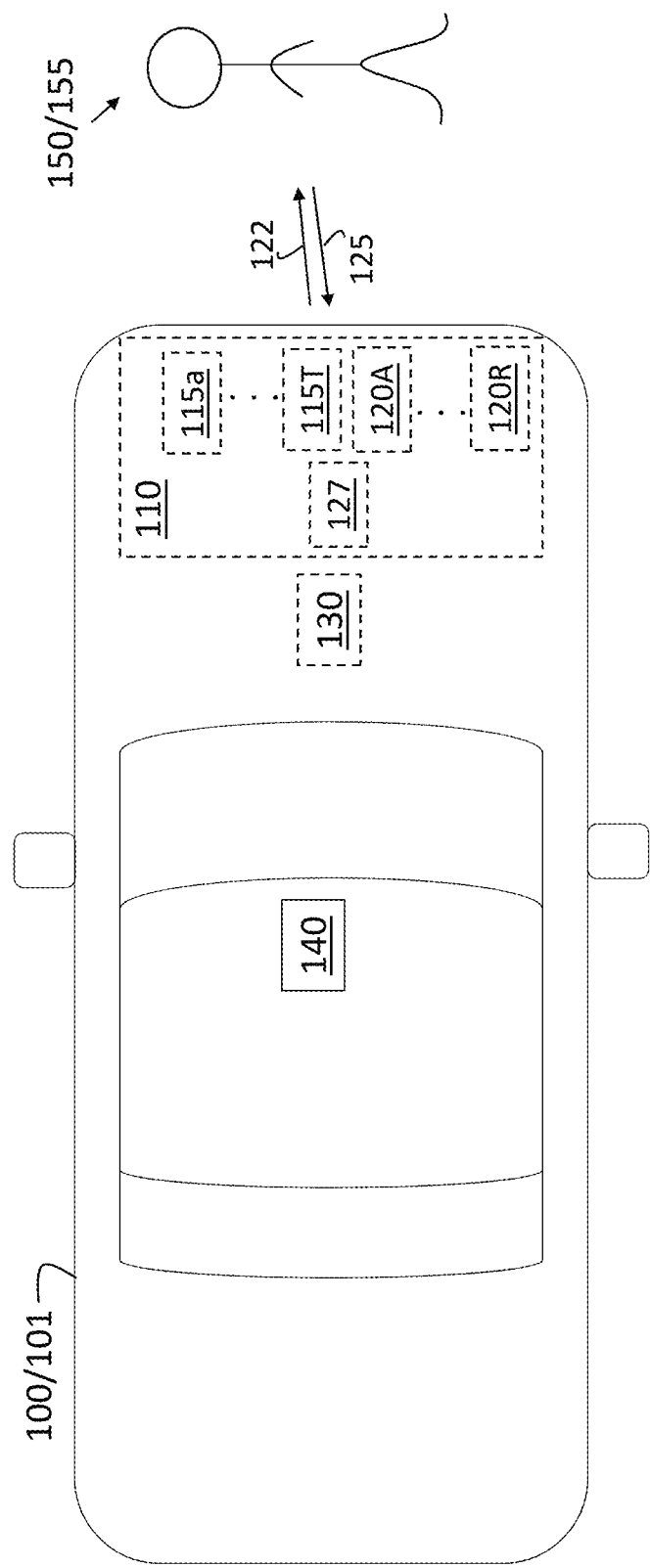
FIG. 1 is a block diagram of a vehicle with a code divisional multiple access (CDMA) multiple input multiple output (MIMO) radar system that transmits a family of orthogonal signals according to one or more embodiments.

The following description is merely exemplary in nature and is not intended to limit the present disclosure, its application or uses. It should be understood that throughout the drawings, corresponding reference numerals indicate like or corresponding parts and features.

As previously noted, a MIMO radar system includes multiple transmitters and multiple receivers that receive all of the reflections resulting from all of the transmitters. Typically, a time division multiple access (TDMA) scheme is used to transmit, in turn, from each transmitter. While a TDMA radar system uses highly orthogonal signals (i.e., there is no interference among reflections resulting from the different transmitters and each reflection is easily associated with the corresponding transmitter), this scheme reduces radar performance (e.g., detection range, maximal Doppler) compared with other approaches, such as CDMA. CDMA signals suffer from orthogonality imperfection and, thus, suffer from cross-correlation (i.e., interference due to reflections resulting from other transmitters). Embodiments of the systems and methods are directed to generating a family of orthogonal signals for transmission in a CDMA radar system. By selecting the set of signals that are transmitted by the multiple transmitters of the MIMO radar system, as detailed herein, orthogonality is increased and, consequently, cross-correlation is reduced. Thus, generation of the family of orthogonal signals according to one or more embodiments facilitates the increase in radar performance that is associated with a CDMA system while decreasing the detection issues associated with cross-correlation.

In accordance with an exemplary embodiment, FIG. 1 is a block diagram of a vehicle 100 with a CDMA MIMO radar system 110 that transmits a family of orthogonal signals according to one or more embodiments. The vehicle 100 shown in FIG. 1 is an automobile 101. The exemplary MIMO radar system 110 includes transmitters 115A through 115T (generally referred to as 115) that emit transmit signals 122. Each transmitter 115 transmits a transmit signal 122 with a different code according to the CDMA scheme, as further discussed. The radar system 110 also includes receivers 120A through 120R (generally referred to a 120) that each obtain received signals 125 based on reflection of the transmit signals 122 by objects 150 in the field of view of the radar system 110. The exemplary object 150 shown in FIG. 1 is a pedestrian 155.

The radar system 110 may additionally include processing circuitry 127. The vehicle 100 includes one or more controllers 130 (e.g., electronic control unit (ECU). The controller 130 may also include processing circuitry. The transmitted signals 122, which are the family of orthogonal signals, may be generated by the processing circuitry 127 of the radar system 110, by the controller 130, or by a combination of the two. The processing circuitry 127 of the radar system 110 and the controller 130 may include an application specific integrated circuit (ASIC), an electronic circuit, a processor (shared, dedicated, or group) and memory that executes one or more software or firmware programs, a combinational logic circuit, and/or other suitable components that provide the described functionality. The vehicle 100 may also include additional sensors 140 (e.g., lidar, cameras). According to alternate or additional embodiments, the components shown in FIG. 1 may be located in or on different parts of the vehicle 100.

Each transmit signal 122, according to one or more embodiments, has a frequency that is a non-linear function (includes tangent and secant (tansec) functions) and is, therefore, a non-linear frequency modulated (NLFM), also referred to as a tansec frequency modulated (TSFM) signal, which is used for low side lobe levels (i.e. cross correlation). The instantaneous frequency f(t) and phase $\varphi(t)$ of the TSFM signal (i.e., chirp) are given by:

$$f(t) = \frac{w\tan(k_1 t)\sec(k_1 t)}{k_2} \quad [EQ. 1]$$

$$\varphi(t) = \frac{2\pi w\sec(k_1 t)}{(k_1 k_2)} \quad [EQ. 2]$$

In EQS. 1 and 2, w, $k_1$, and $k_2$ are as follows:

$$w = \frac{\alpha\beta}{\pi} \quad [EQ. 3]$$

$$k_1 = 2\arctan\left(\frac{B}{2wT}\right) \quad [EQ. 4]$$

$$k_2 = \sec\left(\frac{k_1 T}{2}\right) \quad [EQ. 5]$$

T is the chirp length (i.e., duration of the TSFM signal), B is the chirp bandwidth, and a is the parameter that controls the signal curvature and side lobe peak and main lobe width of the autocorrelation function. As the value of $\alpha$ approaches infinity, the TSFM signal converges to a linear frequency modulated signal whose frequency changes linearly over time. As detailed, one or more embodiments of systems and methods to generate a family of orthogonal signals for use as the transmit signals 122 involve selecting values of $\alpha$ for the signals of the family.

Figure 2:
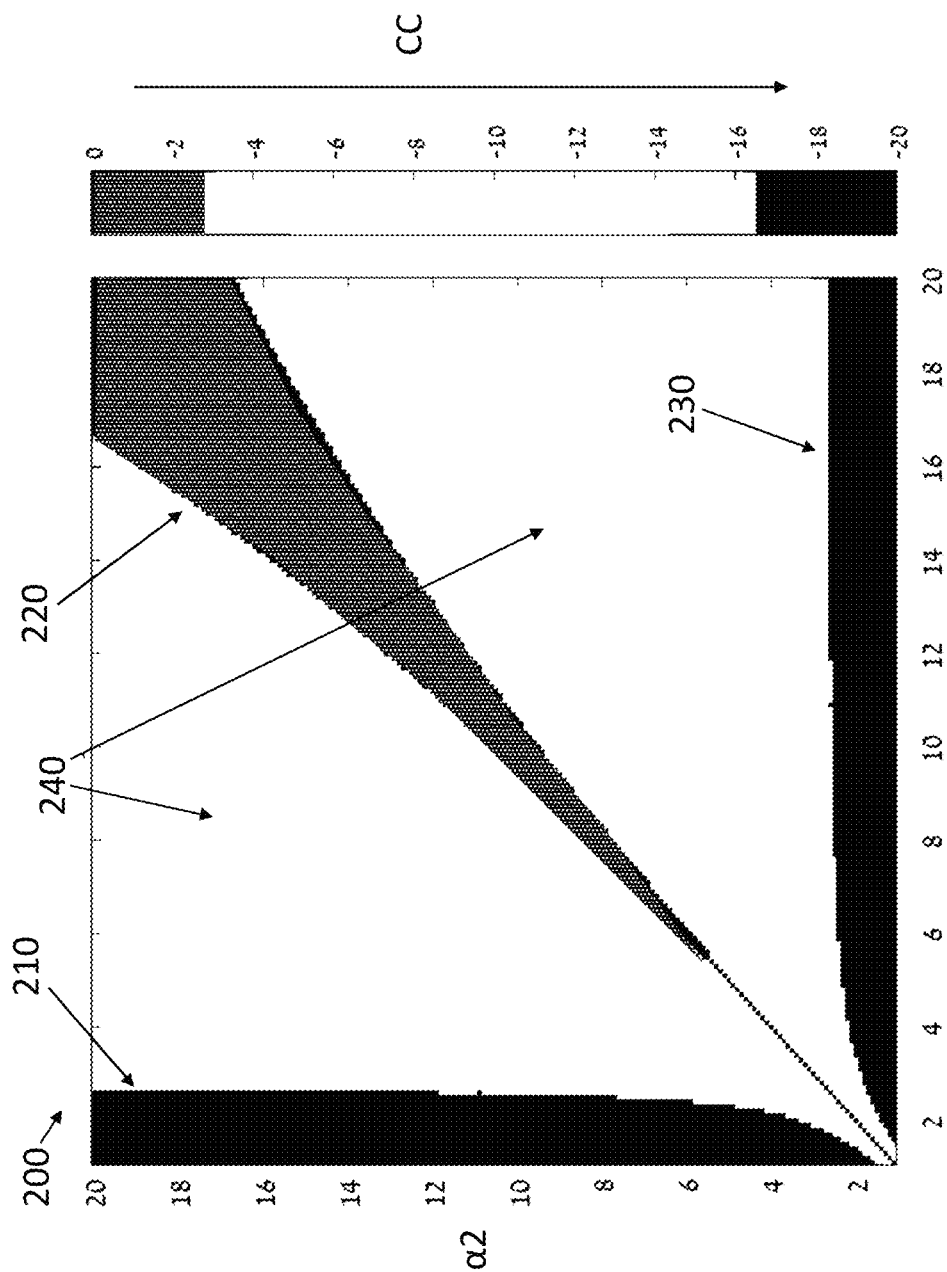
FIG. 2 indicates cross-correlation results for two signals over a range of α values.

FIG. 2 indicates peak cross-correlation results for two TSFM signals over a range of a values. For a TSFM signal with an a value in the range shown for α1 and a second TSFM signal with an $\alpha$ value in the range shown for α2, the graph 200 shows cross-correlation for each α1 and α2 pair. The associated cross-correlations values CC are indicated along the right. As shown, the highest cross-correlation values CC are in the region 220, where α1 and α2 are equal or nearly equal. For example, α1=2 and α2=2 or α1=14 and α2=12 in region 220. This region 220 is associated with cross-correlation values CC as high as −3 to 0. The lowest cross-correlation values CC are in the regions 210 and 230, where α1 and α2 are the most different. For example, α1=2 and α2=16 or α1=10 and α2=2. These regions 210, 230 are associated with cross-correlation values CC as low as −17 to −20. In regions 240, the values of α1 and α2 are not equal but also not too far apart. For example, α=4 and α2=3 or α1=8 and α2=12. The cross-correlation values CC associated with regions 240 are in the range of −3 to −17.

Based on the discussion of the graph 200, a brute-force approach to obtaining a family of orthogonal signals as transmit signals 122 in a CDMA radar system 110 would involve keeping the α values for the transmit signals 122 as far apart as possible. When a small number of transmit signals 122 is needed, this approach is viable. For example, in the simplest case, two transmit signals 122 could be generated with a values between 2 and 20. The complexity of obtaining a solution (i.e., searching the graph 200) may be quantified as $N^L$ with N being the number of different possible values of $\alpha$ and L being the number of signals needed. Thus, for N=1000 and L=10, for example, the complexity may be quantified as $N^L=1000^{10}=10^{30}$. The complexity indicates a number of operations. If each operation takes just 1 microsecond, the exemplary case would require over a trillion years to obtain the 10 transmit signals 122. Thus, as detailed below, more efficient approaches are sought to obtain a family of orthogonal signals.

Generating a family of orthogonal signals according to an exemplary embodiment involves using a joint low cross-correlation algorithm for all the signals except the first. The joint low cross-section (xcorr) algorithm may be represented as follows:

$$\text{for } l = 2{:}L,$$
$$\alpha_l \leftarrow \operatorname{argmin}_{\alpha_l} \Sigma_{i=1}^{l-1} \max[\text{xcorr}\{\text{TSFM}_{\alpha_i}, \text{TSFM}_{\alpha_l}\}]$$
$$\text{end}$$

The first signal with α1 is selected and the algorithm is used to select the additional signals in the family. As indicated by the algorithm, each new α value for each additional transmit signal 122 in the family of orthogonal signals is selected to minimize the sum of cross-correlations (i.e., the joint cross-correlation) with previously determined signals of the family. The complexity of the joint low cross-correlation algorithm is on the order of N*L, as compared to $N^L$ for the brute-force approach, as previously noted.

Generating a family of orthogonal signals according to another exemplary embodiment involves using a minimal average distance family expansion algorithm for all the signals after selecting a first signal (with $\alpha_1$) of the family. The minimal average distance family expansion algorithm may be represented as follows:

$$\text{for } l = 2{:}L,$$
$$\tilde{\alpha}_l \leftarrow \alpha_{1:l-1}$$
$$\text{while } \alpha_l \text{ does not exist}$$
$$\alpha_{all} \leftarrow \max_{\alpha_1}[\text{xcorr}\{TSFM_{\tilde{\alpha}_l}, TSFM_{\alpha_l}\}] \leq \text{threshold}$$
$$\alpha_l \leftarrow \min_l |\tilde{\alpha}_l - \alpha_{all}|$$
$$\text{if } \alpha_l \text{ does not exist}$$
$$\quad \text{threshold} \leftarrow \text{threshold} + \varepsilon$$
$$\text{end}$$
$$\text{end}$$
$$\text{end}$$

In the algorithm, threshold refers to a cross-correlation threshold value, and ε is the value by which the cross-correlation threshold value may be increased. $\tilde{\alpha}_1$ is the previously selected values of α, and $\alpha_{all}$ is all possible candidates for the next α (of the next signal in the family). Specifically, $\alpha_{all}$ are values of α that are sufficiently (i.e., by the threshold value) different than the previously selected values of α. The cross-correlation threshold may be indicated on a logarithmic scale. When the cross-correlation is normalized, the maximal value is 0 and all other values are negative, as is assumed here for explanatory purposes. As the algorithm indicates, the candidate α values $\alpha_{all}$ are ones for which even the highest cross-correlation with previously selected values of α is below the threshold. This threshold is increased by ε, iteratively, if no candidates are identified. This gives rise to the term family expansion in the name of the algorithm, because, using the ε value, candidates $\alpha_{all}$ can be ensured. Among the candidates $\alpha_{all}$, the selected $\alpha_1$ is the one that has the minimal average distance from the previously selected values of α (i.e., from $\alpha_1$). As previously noted, the largest difference (or maximal distance) among α values provides the lowest cross-correlation values. Thus, by selecting the minimal average distance among α values that meet a threshold criteria, the most similar (i.e., worst in terms of cross-correlation) among the candidates is chosen. However, this approach leaves more options for subsequent α values for additional signals of the family.

Figure 3:
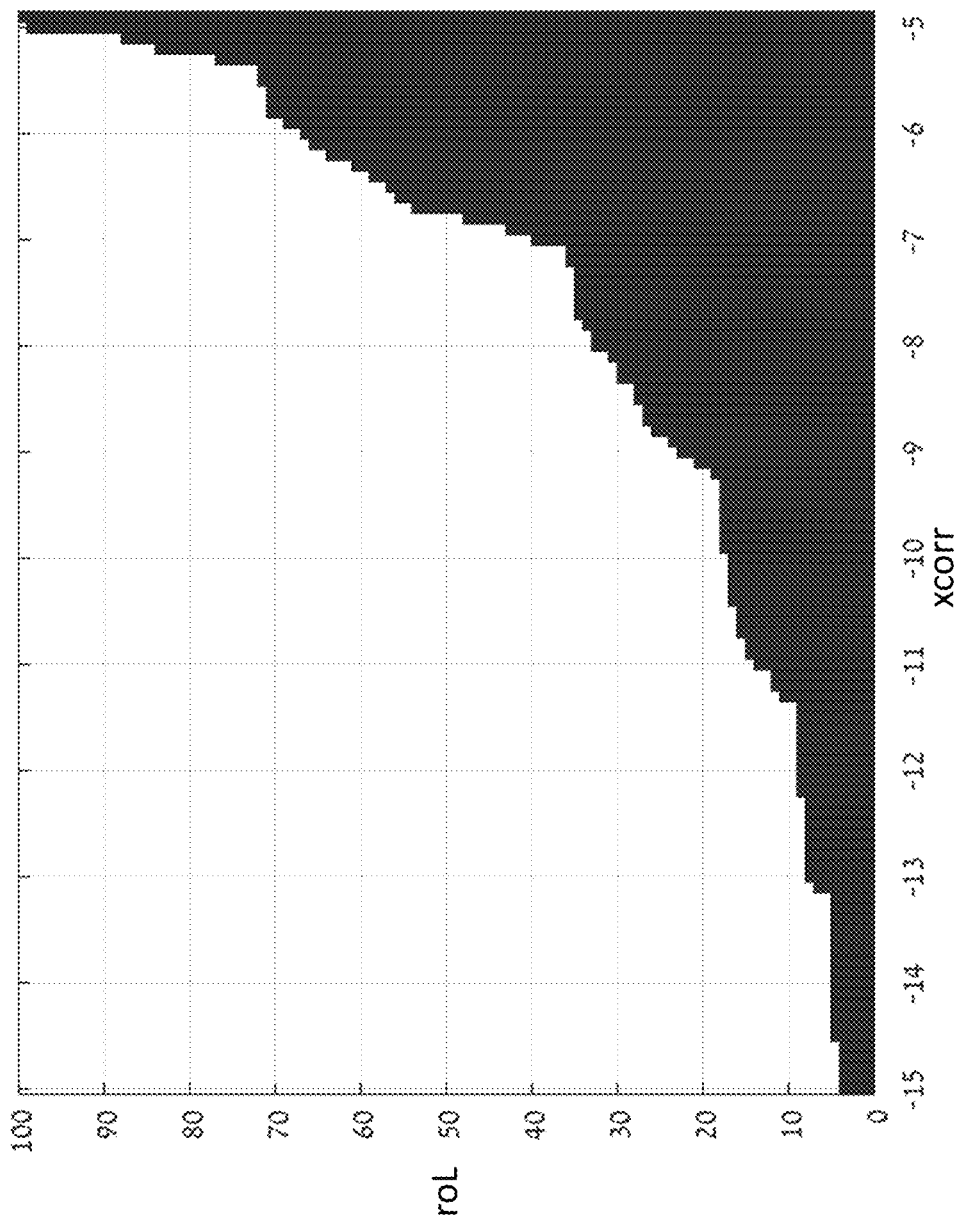
FIG. 3 is an exemplary illustration of the number of aggregated signals that may be determined for a family of orthogonal signals based on a cross-correlation result among existing signals of the family according to the minimal average distance family expansion algorithm.

FIG. 3 is an exemplary illustration of the number of aggregated signals that may be determined for a family of orthogonal signals based on a cross-correlation result among existing signals of the family according to the minimal average distance family expansion algorithm. FIG. 3 shows the threshold value (Th) along one axis and the number of additional signals (rest of L (roL)) that may be added to the family along the perpendicular axis. FIG. 3 reflects the fact that the lower (i.e., farther left) the threshold value (assuming again that cross-correlations are negative values, the bigger the required difference between previous and new values of α), the lower the number of additional signals (rest of L (roL)) that may be added to the family. The complexity associated with the minimal average distance algorithm may be quantified as $NL^2$ (number of threshold values used/ε).

Generating a family of orthogonal signals according to yet another exemplary embodiment involves using an average cross-correlation family generation algorithm for all the signals after selecting a first signal (with $\alpha_1$) of the family. The average cross-correlation family generation algorithm may be represented as follows:

$$\tilde{\alpha}_l \leftarrow \alpha_1$$
$$\text{while } \alpha_l \text{ exists}$$
$$\alpha_{all} \leftarrow \max_{\alpha_1}[\text{xcorr}\{TSFM_{\tilde{\alpha}_l}, TSFM_{\alpha_l}\}] \leq \text{threshold}$$
$$\alpha_l \leftarrow \min_l |\tilde{\alpha}_l - \alpha_{all}|$$
$$\tilde{\alpha}_l \leftarrow \alpha_l$$
$$\text{end}$$

In the algorithm, threshold again refers to a cross-correlation threshold value (which is assumed to be a negative value). In addition, $\tilde{\alpha}_i$ are the previously selected values of α, and $\alpha_{all}$ are all possible candidates for the next α (of the next signal in the family). As the algorithm indicates, the candidate a values $\alpha_{all}$ are ones for which even the highest cross-correlation with previously selected values of α is below the threshold. Among the candidates $\alpha_{all}$, the selected $\alpha_1$ is the one that has the minimal average distance from the previously selected values of α (i.e., from $\tilde{\alpha}_i$). However, unlike the minimal average distance algorithm discussed previously, the threshold value is not increased according to the average cross-correlation family generation algorithm. Instead, if no candidates $\alpha_{all}$ are found, then the algorithm ends without adding signals to the family.

Figure 4:
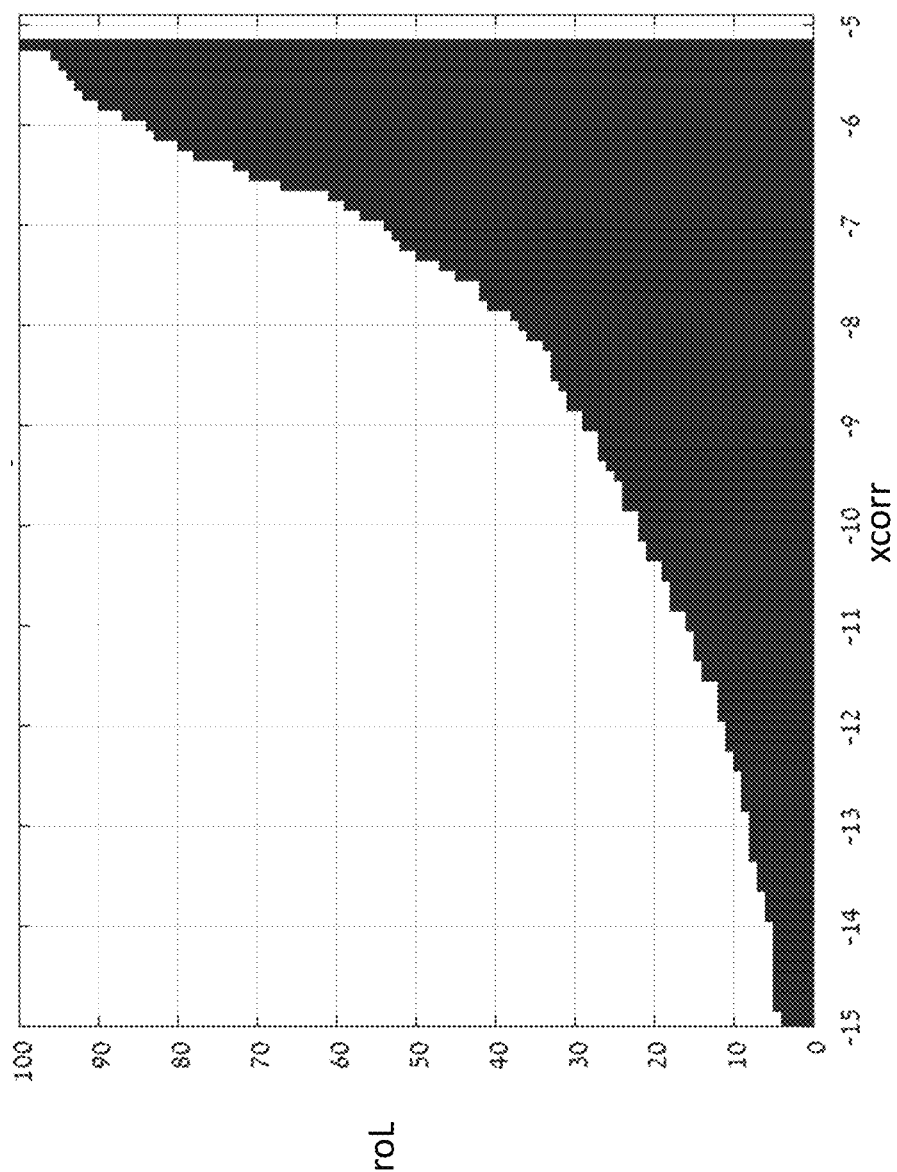
FIG. 4 is an exemplary illustration of the number of signals that may be determined for a family of orthogonal signals based on a cross-correlation result among existing signals of the family according to the average cross-correlation family generation algorithm.

FIG. 4 is an exemplary illustration of the number of signals that may be determined for a family of orthogonal signals based on a cross-correlation threshold according to the average cross-correlation family generation algorithm. FIG. 4 shows the threshold value (Th) along one axis and the number of additional signals (rest of L (roL)) that may be added to the family along the perpendicular axis. FIG. 4, like FIG. 3, reflects the fact that the lower (i.e., farther left) the threshold value (assuming again that cross-correlations are negative values, the bigger the required difference between previous and new values of α), the lower the number of additional signals (rest of L (roL)) that may be added to the family. However, because the threshold value is not adjusted according to the exemplary embodiment associated with FIG. 4, the lower the threshold value, the more likely it is that $\alpha_{all}$ will be empty. The complexity associated with the minimal average distance algorithm may be quantified as NL(threshold).

FIG. 5 is a process flow 500 of a method of generating a family of orthogonal signals for a CDMA MIMO radar system 110 according to the several embodiments discussed herein. At block 510, selecting an a value for the first signal in the family may be done according to more than one embodiment. The a value that results in the signal with the lowest autocorrelation side lobe may be chosen according to one exemplary embodiment. According to an alternate embodiment, a linear frequency modulated signal (i.e., with an a value approaching infinity) may be chosen. At block 520, the processes include using an algorithm to determine additional signals in the family. Previously detailed algorithms that may be selected for use, at block 520, include the joint low cross-correlation algorithm, the minimal average distance family expansion algorithm, and the average cross-correlation family generation algorithm. The process at block 520 is repeated iteratively to obtain all the needed signals of the family.

At block 530, generating transmit signals 122 refers to assigning signals from among the family of signals (determined at block 520) to transmitters 115 of the radar system 110 and transmitting those transmit signals 122 simultaneously. At block 540, obtaining and processing received signals 125 that result from reflection of the transmit signals 122 by one or more objects 150 facilitates obtaining information about the one or more objects 150. The processing of received signals 150 to obtain range, azimuth, and other information related to the one or more objects 150 is well known and is not detailed here. At block 550, controlling vehicle operation based on the information obtained from the received signals 125 may be accomplished through communication between the radar system 110 and the controller 130, for example.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of generating a family of orthogonal signals for a code division multiple access (CDMA) radar system, the method comprising:
   selecting a first signal of the family of orthogonal signals for transmission by one of a plurality of transmitters of the radar system;
   using an algorithm to determine a second signal of the family of orthogonal signals, wherein the algorithm uses cross-correlation values between candidate signals for consideration as the second signal of the family of orthogonal signals and the first signal;
   transmitting the first signal of the family of orthogonal signals and the second signal of the family of orthogonal signals simultaneously from two different transmitters;
   obtaining and processing reflections resulting from transmission of the first signal of the family of orthogonal signals and the second signal of the family of orthogonal signals;
   iteratively using the algorithm to determine additional signals of the family of orthogonal signals, wherein the algorithm uses cross-correlation values between each candidate signal for consideration as one of the additional signals of the family of orthogonal signals and all previously determined ones of the family of orthogonal signals;
   generating each of the candidate signals by changing only a parameter value a from the first signal of the family of orthogonal signals and others of the candidate signals; and
   deriving factors w, k1 and k2 that are used to generate the candidate signals from the parameter value $\alpha$ as follows:

$$w = \frac{\alpha \beta}{\pi}$$

$$k_1 = 2\arctan\left(\frac{B}{2wT}\right)$$

$$k_2 = \sec\left(\frac{k_1 T}{2}\right),$$

where
   B is a bandwidth of each of the candidate signals and T is a duration of each of the candidate signals.

2. The method according to claim 1, wherein the changing the parameter value a changes a curvature of the candidate signals.

3. The method according to claim 1, wherein the generating the candidate signals includes determining instantaneous frequency f(t) and phase $\varphi$(t) of each of the candidate signals as:

$$f(t) = \frac{w\tan(k_1 t)\sec(k_1 t)}{k_2}$$

$$\varphi(t) = \frac{2\pi w \sec(k_1 t)}{(k_1 k_2)}.$$

4. The method according to claim 1, wherein the using the algorithm includes obtaining a sum associated with each candidate signal as a sum of the cross-correlation values between the candidate signal and all previously determined ones of the family of orthogonal signals, and identifying a selected signal among the candidate signals as the candidate signal that results in a lowest value of the sum associated with each candidate signal.

5. The method according to claim 1, wherein the using the algorithm includes identifying a maximum associated with each candidate signal as a maximum value among the cross-correlation values between the candidate signal and all previously determined ones of the family of orthogonal signals that is less than or equal to a threshold value, and identifying a selected signal among the candidate signals as the candidate signal that results in a minimum of the maximum associated with each candidate signal.

6. The method according to claim 5, further comprising increasing the threshold value when the selected signal is not identified.

7. The method according to claim 1, wherein the using the algorithm includes identifying a maximum associated with each candidate signal as a maximum value among the cross-correlation values between the candidate signal and all previously determined ones of the family of orthogonal signals that is less than or equal to a threshold value, and identifying a selected signal among the candidate signals as the candidate signal that results in a minimum of the maximum associated with each candidate signal based on at least one of the candidate signals having the maximum that is less than or equal to the threshold value.

8. A system to generate a family of orthogonal signals for a code division multiple access (CDMA) radar system, the system comprising:
a memory device configured to store a first signal of the family of orthogonal signals for transmission by one of a plurality of transmitters of the radar system;
a processor configured to use an algorithm to determine a second signal of the family of orthogonal signals, wherein the algorithm uses cross-correlation values between candidate signals for consideration as the second signal of the family of orthogonal signals and the first signal;
two different transmitters of the radar system configured to respectively transmit the first signal of the family of orthogonal signals and the second signal of the family of orthogonal signals simultaneously; and
at least one receiver configured to obtain reflections resulting from transmission of the first signal of the family of orthogonal signals and the second signal of the family of orthogonal signals, wherein the processor is further configured to iteratively use the algorithm to determine additional signals of the family of orthogonal signals, and the algorithm uses cross-correlation values between each candidate signal for consideration as one of the additional signals of the family of orthogonal signals and all previously determined ones of the family of orthogonal signals, the processor is further configured to generate each of the candidate signals by changing only a parameter value a from the first signal of the family of orthogonal signals and others of the candidate signals, and changing the parameter value a changes a curvature of the candidate signal, and the processor is further configured to derive factors w, k1 and k2 that are used to generate the candidate signals from the parameter value a as follows:

$$w = \frac{\alpha\beta}{\pi}$$

$$k_1 = 2\arctan\left(\frac{B}{2wT}\right)$$

$$k_2 = \sec\left(\frac{k_1 T}{2}\right),$$

where
B is a bandwidth of each of the candidate signals and T is a duration of each of the candidate signals.

9. The system according to claim 8, wherein the processor generates the candidate signals by determining instantaneous frequency f(t) and phase φ(t) of each of the candidate signals as:

$$f(t) = \frac{w\tan(k_1 t)\sec(k_1 t)}{k_2}$$

$$\varphi(t) = \frac{2\pi w \sec(k_1 t)}{(k_1 k_2)}.$$

10. The system according to claim 8, wherein the algorithm includes obtaining a sum associated with each candidate signal as a sum of the cross-correlation values between the candidate signal and all previously determined ones of the family of orthogonal signals, and identifying a selected signal among the candidate signals as the candidate signal that results in a lowest value of the sum associated with each candidate signal.

11. The system according to claim 8, wherein the algorithm includes identifying a maximum associated with each candidate signal as a maximum value among the cross-correlation values between the candidate signal and all previously determined ones of the family of orthogonal signals that is less than or equal to a threshold value, and identifying a selected signal among the candidate signals as the candidate signal that results in a minimum of the maximum associated with each candidate signal.

12. The system according to claim 11, wherein the processor is further configured to increase the threshold value when the selected signal is not identified.

13. The system according to claim 8, wherein the algorithm includes identifying a maximum associated with each candidate signal as a maximum value among the cross-correlation values between the candidate signal and all previously determined ones of the family of orthogonal signals that is less than or equal to a threshold value, and identifying a selected signal among the candidate signals as the candidate signal that results in a minimum of the maximum associated with each candidate signal based on at least one of the candidate signals having the maximum that is less than or equal to the threshold value.

14. The system according to claim 8, wherein the radar system is in a vehicle, and information processed from the reflections is used to control operation of the vehicle.

* * * * *